United States Patent

Spicher

[11] Patent Number: 5,955,526
[45] Date of Patent: *Sep. 21, 1999

[54] ANTISTATIC ADDITIVE FOR ORGANIC POLYMER COMPOSITIONS

[75] Inventor: Dennis R. Spicher, Marietta, Ga.

[73] Assignees: Cellular Technology International, Inc., Atlanta; Chemfoam International, Inc., Duluth, both of Ga.

[*] Notice: This patent is subject to a terminal disclaimer.

[21] Appl. No.: 08/948,881

[22] Filed: Oct. 10, 1997

Related U.S. Application Data

[63] Continuation of application No. 08/498,468, Jul. 5, 1995, Pat. No. 5,677,357.

[51] Int. Cl.$^6$ .............................. C08K 3/32; C08K 3/24
[52] U.S. Cl. ..................... 524/408; 260/DIG. 16; 252/518; 252/521; 524/410; 524/417
[58] Field of Search ................... 260/DIG. 16; 524/408, 524/410, 417; 252/521, 518

[56] References Cited

U.S. PATENT DOCUMENTS

| | | | |
|---|---|---|---|
| 2,940,854 | 6/1960 | Gray | 260/DIG. 16 |
| 3,190,763 | 6/1965 | Schleede et al. | 106/186 |
| 3,239,482 | 3/1966 | Rapp | 524/410 |
| 3,359,241 | 12/1967 | Dobinson | 260/75 |
| 3,454,540 | 7/1969 | Clovis | 260/DIG. 16 |
| 3,655,332 | 4/1972 | Smith | 252/464 |
| 3,848,063 | 11/1974 | Cannon et al. | 252/464 |
| 4,618,630 | 10/1986 | Knobel et al. | 521/114 |
| 5,021,473 | 6/1991 | Macholdt et al. | 523/451 |
| 5,677,357 | 10/1997 | Spicher | 521/85 |

FOREIGN PATENT DOCUMENTS

| | | |
|---|---|---|
| 5350 | 9/1954 | Germany . |
| 2443075 | 3/1976 | Germany . |
| 63-295667 | 12/1988 | Japan . |
| 9429401 | 12/1994 | WIPO . |

*Primary Examiner*—Morton Foelak
*Attorney, Agent, or Firm*—Ostrolenk, Faber, Gerb & Soffen, LLP

[57] ABSTRACT

An antistatic additive including a hexahalogenated ionic compound, and an antistatic additive composition for organic polymer compositions including an antistatically-effective amount of the hexahalogenated ionic compound, a solvent for the hexahalogenated ionic compound, and a diluent compatible with the hexahalogenated ionic compound, the solvent and the organic polymer composition. The hexahalogenated phosphate compound is preferably either potassium hexafluorophosphate, sodium hexafluorophosphate, and ammonium hexafluorophosphate. Organic polymer compositions containing the additive also are disclosed, as are methods of manufacturing both the additive and the polymer compositions.

2 Claims, No Drawings

ANTISTATIC ADDITIVE FOR ORGANIC POLYMER COMPOSITIONS

This is a continuation of application Ser. No. 08/498,468, filed Jul. 5, 1995, now U.S. Pat. No. 5,677,357, issued Oct. 14, 1997.

BACKGROUND OF THE INVENTION

1. Field of the Invention

The present invention relates to antistatic additives for chemical compositions, and, more particularly, to antistatic hexahalogenated ionic compounds, and antistatic additives including hexahalogenated ionic compounds for organic polymer compositions such as polyurethane foams.

2. Description of the Related Art a. Uses of Organic Polymer Compositions:

Flexible polyurethane (PU) foam is used widely as a cushioning material in packaging applications. PU foam, however, is an inherently static-producing material. PU foam must be rendered "anti-static" in order to package static-sensitive items, such as computer disks, computer chips, and electronic components. Various additives can alter the electrostatic properties of the foam so that it becomes static-dissipative, and therefore useful as a material with protection against static discharge.

The ease of cutting and fabricating flexible antistatic PU foam into complex shapes makes it an ideal cushioning material for composite packaging for many static sensitive products, as noted above.

In addition, antistatic PU foam in sheet form also competes with various types of polyolefin wrappings (antistatic blown polyethylene sheeting) in static-protected lined envelopes and mailing tubes. Much computer software in diskette form is mailed to retail customers in envelopes and mailers lined with antistatic cushioning material.

A third application area for antistatic PU foam is in mats and pads for electrosensitive areas such as computer rooms. Footwear requiring antistatic soling is also a growing use for polyurethane foam and elastomers.

b. Classification of Electro-dissipative Materials:

The static-dissipative properties of materials such as PU foam are classified as follows:

Surface and Volume Resistivity

This is the broad preliminary separation of materials into three classifications based on ASTM Test Method D-257. Typically a measurement is made on the material to determine surface resistivity, and then the volume resistivity can be calculated knowing the thickness of the sample tested. Volume resistivity also can be measured directly using ASTM D-991.

"Antistatic" is defined within the industry with respect to ASTM Test Method D-257. Materials are classified as follows:

| Category | Surface Resistivity (in Ohms/square) |
| --- | --- |
| Conductive | $<1 \times 10^3$ |
| Dissipative | $<1 \times 10^{12}$ |
| Insulative | $>1 \times 10^{12}$ |

This is the first broad classification of electrical properties. The D-257 classification has essentially refined and replaced the previously used "Triboelectric Series" as described in the article by Al Lerner entitled "A New Additive for Electrostatic Discharge Control in Foams and Elastomers", pages 31–34, *Journal of Cellular Plastics* (1985).

For static-sensitive packaging purposes, the interest is in producing PU foam that falls within the "dissipative" category. "Dissipative" polyurethane foam with surface resistivities of less than $1 \times 10^{12}$ ohms/sq. can be produced by the addition of an antistatic additive to the formulation.

By contrast, to reach the "conductive" category usually requires a post-treatment applied by dipping or spraying a coating on the foam. In comparison, typical unmodified PU foam exhibits a surface resistivity value of $>1 \times 10^{17}$ ohms/sq.

Static Decay Time

After the initial classification as "dissipative", the material is tested for Static Decay Time. This is defined as the amount of time it takes to dissipate a given electrical charge, with the test conducted according to Federal Test Method Standard 101, Method 4046 ("Electrostatic Properties of Materials"). While various specifications differ on the static delay time they require, most military and commercial specifications call for a value of less than 2 seconds.

Other Classifications

After a foam has passed the Surface Resistivity and Static Decay Time requirements, various military and commercial specifications call for additional requirements. Some of these specifications are:

Color: The industry standard colors are pink and charcoal gray. Typically, the pink color denotes foams with densities of around 1.3 pcf; the charcoal gray denotes 1.8 pcf.

Contact Corrosivity: This is a determination of how corrosive the foam is when placed in contact with another material. Obviously, the packaging material should not cause corrosion of the material it is intended to protect. Corrosivity is a function of what types of additives the foam contains, in particular the presence of certain amines and chloride-producing compounds (such as flame retardants). This test is defined by Federal Test Method Standard 101C.3005.

Dynamic Cushioning: This is required by certain military specifications and requires the plotting of graphs of "Peak Acceleration" versus "Static Stress" for varying thicknesses of foam. This test is required by the more sophisticated purchasers of packaging foams.

Others: Some specifications also include requirements for air flow, tensile, tear, elongation, density and firmness, all of the normal PU foam physical tests.

c. Prior Art Antistatic Additives:

Prior art antistatic additive formulations for PU were based on amine-based quaternary ammonium compounds. Such amine-based preparations are disfavored in PU foams used for electronic packaging applications because amines exhibit moderate to high levels of contact corrosivity (defined above) which can cause damage to the product itself.

The prior art amine-based additives are also migratory, and move to the surface of the PU foam as humidity decreases. Although such migration affords the best static protection at the surface of the material, the migration exacerbates the contact corrosivity problem. Another serious drawback to amine-based materials is that they affect the catalysis of the polyurethane reaction used to produce PU foam, and are therefore somewhat unpredictable in their actions from production run to production run. They also tend to soften the foam. As a result, amine-based preparations are not now widely used in PU foams.

Another prior art additive is disclosed in U.S. Pat. No. 4,618,630, issued Oct. 21, 1986 to Knobel et al., and assigned at issue to Dow Chemical Co. (the Dow additive). The Dow additive is an organic boron composition that is non-migratory, non-corrosive and chemically inert with respect to the polyurethane reaction. The Dow product has a relatively high cost, and a high use level (8–10 parts per hundred parts polyol) required to achieve acceptable antistatic performance.

The Dow additive also depends on and incorporates an "enhancer" compound as part of their additive, without which the Dow additive cannot achieve its antistatic test performance.

SUMMARY OF THE INVENTION

The present invention overcomes the disadvantages of the prior art, such as those noted above, by providing hexahalogenated ionic compounds as antistatic agents. The antistatic hexahalogenated ionic compounds used according to the present invention can include any of the halogens, i.e., fluorine, chlorine, bromine, iodine, or astatine. The hexahalogenated ionic compounds having antistatic activity according to the present invention broadly include ionic salts of hexahalogenated compounds from Group V of the periodic table, i.e., nitrates, phosphates, arsenates, antimonates, and bismuthates. Hexahalogenated ionic salts of the present invention can be formed, for example, with any of the salt-forming cations, such as ammonium, or any of the salt-forming alkali metals, such as lithium, sodium, rubidium, and cesium.

In addition, according to the present invention, the hexahalogenated ionic compound is included in an additive composition for use in chemical compositions. According to the present invention, the antistatic additive for chemical compositions includes a hexahalogenated ionic compound, a solvent for the hexahalogenated ionic compound, and a diluent compatible with the hexahalogenated ionic compound, the solvent and the chemical composition.

In addition, the present invention provides an antistatic organic polymer composition and a method of making the composition in which an organic polymer composition is rendered antistatic by including the hexahalogenated ionic compound as an antistatic additive. In a preferred embodiment, the organic polymer composition is polyurethane foam.

In addition to polyurethanes, the organic polymer used in the antistatic composition can be a polyolefin, polyvinyl chloride, polyvinylidene chloride, a polyester, a poly(vinyl aromatic), an acrylonitrile-butadiene-styrene polymer, a polycarbonate or a copolymer of an olefin with carbon monoxide or vinyl alcohol. The organic polymer preferably is polyurethane foam.

The present invention represents a significant cost-performance improvement over the Dow additive noted above. The present invention is also non-migratory, non-corrosive and relatively inert with respect to production processing. Significantly, when added to polyurethane foam at a level of 3–5 parts per hundred parts polyol, the present invention renders the resulting polyurethane polymer "antistatic." Use levels of 3–5 pphp of the present invention gives equivalent electrostatic results as the Dow additive at 8–10 parts.

Moreover, the antistatic additive of the present invention does not depend on or utilize any type of "enhancer" to achieve equivalent performance results, such as that required by the Dow additive.

DETAILED DESCRIPTION OF THE PREFERRED EMBODIMENTS

I. ANTISTATIC COMPOUND

The active antistatic compounds according to the present invention are hexahalogenated ionic compounds. The antistatic compounds of the present invention can be described generally as the hexahalogens of the Group V elements, and salts thereof. The antistatic hexahalogenated ionic compounds of the present invention include the ammonium, lithium, sodium, potassium, rubidium, and cesium salts of hexafluoro-, hexachloro-, hexabromo-, hexaiodo-, and hexaastatodo-nitrate, phosphate, arsenate, antimonate, and bismuthate.

The antistatic compound can be used in neat form, according to the present invention. For example, the antistatic compound can be added as a powder in the extrusion of polyethylene pellets. The range of the active ingredient according the present invention which is needed to render, for example, an organic polymer composition antistatic, is dependent upon polymer density. The higher the density of the polymer composition, the less antistatic additive is required. Effective amounts can be determined by routine experimentation by those skilled in the art.

The choice of the particular hexahalogenated ionic compound to be used depends in part on commercial availability. Various hexahalogenated phosphates, for example, in combination or alone, can be used as the active ingredient, potassium hexafluorophosphate being most preferred, though others are commercially available.

One basis for choosing the active ingredient is the decomposition temperature of the chosen active. The potassium form, for example, has a decomposition temperature above 600° C.

II. ANTISTATIC ADDITIVE COMPOSITION

The preferred antistatic additive composition of the present invention includes an antistatically-effective amount of one of the hexahalogenated ionic compounds, upon addition of the additive to the composition to be rendered antistatic. In addition, the additive composition can include one or more co-solvents, and diluent.

A. Active Ingredient

The active antistatic ingredient for the additive composition according to the present invention is the hexahalogenated ionic compound described above. The antistatic ionic compound of the present invention can be included in the additive composition in varying amounts. In a typical application, the ionic compound is included in an amount ranging approximately from 0.5–10% by weight of the additive composition. In a most preferred embodiment, the composition of the present invention is included in the 2.25–4.5% range by weight of the antistatic composition of the present invention. The above percentages are illustrative, and may be varied depending on various factors, including the chemical formulation or type of polymer to be treated with the antistatic additive.

B. Solvent

In formulating the antistatic additive composition of the present invention, a co-solvent can be included to solubilize the active ingredient. The solvent employed can be any compound that will solubilize the active ingredient, examples of which are water, and polyalkylene glycol dialkyl ethers. A preferred dialkyl ether is diglyme.

The co-solvent, preferably a polyalkylene glycol dialkyl ether, is included in the range of approximately 1.1–22% by weight of the additive composition. The co-solvent is most preferably used in the 4.5–9.0% range. Again, these percentages can be varied outside these ranges depending upon the requirements of the particular application.

C. Diluent

A diluent can be included in the antistatic additive of the present invention to make the active/co-solvent system compatible with the composition to be treated. The diluent can be any compound that is compatible with the active/solvent system and the composition to be rendered antistatic.

When preparing PU foams, for example, a urethane polyol is a preferred diluent. Such a polyol is completely compatible with generally-used foam formulations, and is readily available.

The remainder of the composition is made up of a diluent, such as urethane polyol (a 3,500 molecular weight ethylene oxide/propylene oxide adduct of glycerine).

Other diluents can be used, including, but not limited to polypropylene glycols and triols, including dipropylene glycol; poly(oxy)propylene glycols and triols, including but not limited to glycerine and/or hexanetriol-initiated triols; and plasticizers that are not "enhancers" as that term is described in U.S. Pat. No. 4,618,630, noted above.

III. PREFERRED METHOD OF ADDITIVE MANUFACTURE

The following is a description of the batch blending procedure for the production of antistatic additive of the present invention.

1. The entire amount of co-solvent is added to a small, clean, dry reactor. The co-solvent is preheated to 110–115° F. with slow agitation.

When the co-solvent is at the proper temperature, the entire amount is transferred to a large, cone-bottom reactor.

2. The hexahalogenated ionic compound is examined for evidence of clumping, and any clumps are broken up to ensure a uniform, free-flowing powder.

3. With constant high shear agitation, the entire amount of hexahalogenated ionic compound is slowly dissolved in the heated co-solvent. Complete dissolution of the hexahalogenated ionic compound may take 30–40 minutes.

Overheating should be avoided, as overheating can cause the loss of co-solvent through evaporation.

4. Approximately one-half of the total amount of diluent is added to the co-solvent/hexahalogenated ionic composition solution with agitation. Agitation takes place under high shear for 15–20 minutes to solubilize any undissolved hexahalogenated ionic compound. The remaining diluent is added and mixed until uniform.

5. The batch is allowed to cool and clarify in the reactor for approximately 30–60 minutes. The final product may be clear in color but somewhat hazy in appearance.

6. The blend is filtered to remove all undissolved hexahalogenated ionic compound or particulate matter.

IV. FOAM PRODUCTION

Flexible PU foam is produced from a mixture of chemical ingredients (mostly in liquid form; some are slurried or dispersed solid in liquid) which are brought together in a mixing head and then dispensed on a moving conveyor lined with plastic film or kraft paper.

The reaction of the polyol and isocyanate produce the solid portion of the polymer, while at the same time a competing reaction between water and isocyanate generates carbon dioxide gas, this gas giving the reaction mixture a foaming, or "cellular" quality (as opposed to solid elastomer).

The polyol-isocyanate reaction is controlled (catalyzed) by the addition of a small amount of tin-based catalyst (stannous octoate or dibutyl tin dilaurate), while the water-isocyanate reaction is catalyzed by a small amount of a tertiary amine-type additive. A silicone surfactant is included which stabilizes the rising foaming mass until it "cures" or solidifies into a self-supporting block.

The chemical components are delivered via pump and metering controls to the mixing head in separate streams, or in some cases certain of the components will be pre-combined ("batched") and then delivered to the mixing head. The antistatic additive is added at this stage either as a separate component, or prebatched with one of the other components.

V. ANTISTATIC FOAM PRODUCTION AND FORMULATIONS

Example 1

A typical 1.5 pcf, 36 Indentation Load Deflection (ILD) formulation using the present invention (commercially available from the assignee of the present invention as CHEMFOAM® D-100 Antistatic Additive) is as follows:

| Component | Parts per Hundred (based on polyol) |
| --- | --- |
| THANOL ® 3020 (55 hydroxyl, EO/PO polyether triol) | 100 |
| Water | 4.4 |
| CHEMFOAM ® 200 Amine Catalyst | 0.20 |
| Union Carbide ® L-620 Silicone Surfactant | 0.9 |
| FOMREZ ® C-4-N Tin Catalyst | 0.26 |
| CHEMFOAM ® D-100 Antistatic Additive | 5.0 |
| Red Pigment | As desired |
| Toluene Diisocyante 80/20 | 108 index |

Antistatic Results:

| % Relative Humidity (@ 77° F.) | Static Decay Time (seconds) | Surface Resistivity (ohms/sq) |
| --- | --- | --- |
| 12 | 0.12 | $2.7 \times 10^{10}$ |

This formulation produces a commercial grade of antistatic foam with good antistatic properties. Since antistatic foams are typically used in packaging applications, many users desire a lower airflow, tighter foam which can be achieved by adjustments to the tin catalyst.

Example 2

A typical 1.5 pound-per-cubic-foot, 36 IFD antistatic flexible polyether formulation is given below:

| Component | Parts per Hundred (based on polyol) |
| --- | --- |
| THANOL ® 3020 Polyol (55 hydroxyl, EO/PO polyether triol) | 100 |
| Water | 4.4 |
| CHEMFOAM ® 200 Amine Catalyst | 0.2 |
| Union Carbide ® L-620 Silicone Surfactant | 0.9 |
| Witco FOMREZ ® C-4-N Tin Catalyst | 0.26 |
| CHEMFOAM ® D-100 Antistatic Additive | 5.0 |
| Red Pigment | As desired |
| Toluene Diisocyanate 80/20 | 108 index |

Concentrations of each ingredient are given based on "parts per hundred" of the polyol. The formulations are generally based on "100 parts polyol". To determine the stoichiometric amount of isocyanate to be used (or in this case, an 8% excess of TDI, denoted as "108 index"), the total equivalent weight of hydroxyl functionality in the mixture is calculated (polyol, water and any other hydroxyl-containing components, since the isocyanate reacts with hydroxyl-containing ingredients) and an equivalent weight of TDI used. Note that the present invention, because it is diluted with a hydroxyl-containing compound, must be included in the stoichiometric isocyanate calculations.

Use levels of antistatic additive based on weight percent can easily be calculated by summing the total weight of all the components and expressing the antistat level in percent form. For example, the antistatic additive is used in Example 2 above at 5+166.76=3% by weight.

VI. EFFICACY

Test results demonstrate that the antistatic ionic compounds and the antistatic additive of the present invention advantageously provide a dramatic reduction in volume resistivity of almost 84% and a reduction in surface resistivity of 83% at a 30% lower use level than the Dow additive noted above.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. An organic polymer composition stabilized against static comprising;
    a pelletized polyethylene; and
    an antistatically-effective amount of a hexahalogenated ionic compound selected from the group consisting of ammonium, lithium, sodium, potassium, rubidium, and cesium salts of hexafluoro-, hexachloro-, hexabromo-, hexaiodo-, and hexaastatodo-nitrate, phosphate, arsenate, antimonate, and bismuthate.

2. A method of imparting antistatic properties to an organic polymer composition, the method comprising the steps of:
    preparing an antistatic additive composition by:
        heating a co-solvent, selected from the group consisting of water and polyalkylene glycol dialkyl ethers, to 110–115° F.;
        dissolving in the heated co-solvent a hexahalogenated ionic compound; and
        diluting the dissolved compound and solvent with a diluent selected from the group consisting of urethane polyol, polypropylene glycols and triols, poly(oxy)propylene glycols and triols; and
    dispersing an antistatically-effective amount of the antistatic additive composition in the organic polymer composition.

* * * * *